United States Patent
Ursel et al.

(10) Patent No.: US 7,543,792 B1
(45) Date of Patent: Jun. 9, 2009

(54) DEVICE AND METHOD FOR ADJUSTING SEATS IN VEHICLES

(75) Inventors: Eckhard Ursel, Buehl (DE); Gerhard Genter, Achern (DE); Manfred Winter, Lichtenau (DE); Walter Haussecker, Buehlertal (DE); Herbert Schiller, Buehlertal (DE); Erik Maennle, Oberkirch (DE); Guenter Hartz, Buehlertal (DE); Joerg Wolf, Karlsruhe (DE); Werner Prohaska, Ottersweier (DE); Martin Steuer, Buehlertal (DE); Hansjuergen Linde, Coburg (DE); Uwe Neumann, Bamberg (DE); Andreas Rehklau, Coburg (DE); Dieter Scheer, Fisch (DE)

(73) Assignee: Robert Bosch GmbH, Stuttgart (DE)

( * ) Notice: Subject to any disclaimer, the term of this patent is extended or adjusted under 35 U.S.C. 154(b) by 875 days.

(21) Appl. No.: 09/913,034

(22) PCT Filed: Nov. 25, 2000

(86) PCT No.: PCT/DE00/04210

§ 371 (c)(1),
(2), (4) Date: Feb. 8, 2002

(87) PCT Pub. No.: WO01/42040

PCT Pub. Date: Jun. 14, 2001

(30) Foreign Application Priority Data

Dec. 9, 1999 (DE) ................................ 199 59 411

(51) Int. Cl.
*F16M 13/00* (2006.01)

(52) U.S. Cl. ..................... 248/638; 248/550; 297/344.1
(58) Field of Classification Search .............. 248/163.1, 248/424, 425, 429, 638, 550; 297/344.1, 297/344.12, 344.13, 344.14, 344.17, 313
See application file for complete search history.

(56) References Cited

U.S. PATENT DOCUMENTS

| 3,874,626 | A | * | 4/1975 | Gross et al. ................. 248/399 |
| 4,793,583 | A | * | 12/1988 | Bergacker et al. ........... 248/550 |
| 4,969,624 | A | * | 11/1990 | Ustelentsev et al. ......... 248/550 |
| 5,586,740 | A | | 12/1996 | Borlinghaus et al. ........ 248/157 |
| RE35,572 | E | * | 7/1997 | Lloyd et al. ................. 248/562 |
| 5,765,803 | A | * | 6/1998 | Graham ...................... 248/624 |
| 5,812,399 | A | * | 9/1998 | Judic et al. ............. 364/424.05 |
| 5,882,060 | A | * | 3/1999 | Walk et al. ................ 296/65.01 |
| 5,931,533 | A | * | 8/1999 | Lance .................... 297/344.18 |
| 5,975,633 | A | * | 11/1999 | Walk et al. ............... 297/284.9 |
| 6,037,731 | A | * | 3/2000 | Fruehauf et al. ............ 318/468 |

FOREIGN PATENT DOCUMENTS

| DE | 298 15 521 U | 12/1998 |
| EP | 0 401 092 A | 12/1990 |
| WO | 97 48570 A | 12/1997 |

* cited by examiner

*Primary Examiner*—J. Allen Shriver
*Assistant Examiner*—Steven Marsh
(74) *Attorney, Agent, or Firm*—Michael J. Striker

(57) ABSTRACT

The invention relates to a device for adjusting a vehicle seat, the frame structure (4, 5, 6) of which can be adjusted using drive motors (40) having presupported gear units (39), and the vehicle seat is accommodated on two seat rails (1, 2) arranged parallel to each other. The frame structure (4, 5, 6) of the vehicle seat can be adjusted spherically using lifting elements (8, 9, 10) in two planes separated from each other.

11 Claims, 7 Drawing Sheets

DEVICE AND METHOD FOR ADJUSTING SEATS IN VEHICLES

BACKGROUND OF THE INVENTION

In general, passengers in motor vehicles can only adjust their seat position statically in advance. The seat position is usually not adjusted during the ride. The seat position of the vehicle passengers does not adapt to the driving situations encountered.

In previously known and presently common motor vehicle systems, the vehicle passengers select the seat position in the vehicle on an individual basis that they perceive to be the most favorable and comfortable before the trip begins. During the trip, the vehicle passengers are generally subjected to transverse forces resulting from lateral acceleration, when travelling around corners, for example. Moreover, transverse forces occur, which can result from braking and decleration phases during the ride. During the ride, transverse stresses arise between the cushions of the vehicle seats and the vehicle passengers due to the dynamic forces which are a function of the driving situation and which have an effect on the passengers, which transverse stresses can be perceived by the vehicle passengers as very uncomfortable. In particular when the level of the transverse stresses exceeds the respective personally acceptable threshold of the vehicle passengers.

SUMMARY OF THE INVENTION

Using the proposed solution according to the invention, the vehicle seat can be adjusted in braking and deceleration phases during the ride in its front section as a function of the degree of deceleration determined by the sensor technology in a fashion that counteracts the force that occurs. In the presence of lateral acceleration forces occurring necessarily during cornering as a result of centrifugal force, the vehicle seat, as a result of its three-point mounting, can be tipped around its longitudinal axis toward the center of the curve in order to counteract the centrifugal forces that occur. When cornering to the right, for example, the left lifting element is extended further upward in relation to the right lifting element in order to bring about a tilting of the vehicle seat around its longitudinal axis.

The lifting elements underneath the frame structure support this in the fashion of a three-point mounting, whereby a lifting element located in the center is provided on the front side of the frame structure, and the adjustment of the frame structure around the longitudinal axis of the motor vehicle oriented parallel to the vehicle axis can take place by way of two independently controllable lifting elements located in the rear section of the frame structure.

To accommodate suddenly-occurring crash forces, the lifting elements can be connected with each other by way of space rods. By arranging the space rods underneath the frame structure carrying the vehicle seat, the vehicle seat can be moved upward and downward in an approximately straight line; in addition, the vehicle seat is secured against rotation in relation to its vertical axis as a result of the space rod arrangement. The diagonals of the space rods also allow the forces occurring in a crash to be directed into the vehicle chassis.

The lifting elements, on the one hand, are provided with self-locking gears between drive motor and drive spindles. Moreover, a spring element arrangement is provided underneath the spindle nut. The spring elements can be coil springs connected in parallel, or they can be designed as spring packs—they support the drives of the lifting elements for the frame structure during its upwardly directed motion. To make the up-and-down motion possible, the lifting elements comprise inner and outer tubes that are inserted into each other in telescoping fashion. The tube arrangement comprises a threaded spindle that can be driven by the drive motor, the spindle nut of which is limited in its lower position by the block length of the spring elements, and in its maximum extended position by fixing straps provided on the outside of the lifting element.

Using the further proposed method for adjusting the frame structure of a vehicle seat according to the invention, the lifting elements that accommodate the frame structure of the vehicle seat are controlled sensor-dependently in such a fashion that the vehicle seat is adjusted in such a way as to counteract the forces occurring as a function of the driving situation. This can be carried out, on the one hand, by way of a pitching motion of the vehicle seat initiated by the sensor technology when the vehicle brakes are operated; on the other hand, the vehicle seat can be tilted toward the center of the curve around its longitudinal axis parallel to the longitudinal axis of the vehicle during cornering. In addition to an electronic actuation of the lifting elements of the frame structure underneath the vehicle seat, these can also be integrated in the hydraulic system—such as the power steering system—of the vehicle.

BRIEF DESCRIPTION OF THE DRAWING

The invention will be described in greater detail below using the diagram.

DESCRIPTION OF THE PREFERRED EMBODIMENTS

Figure 1:
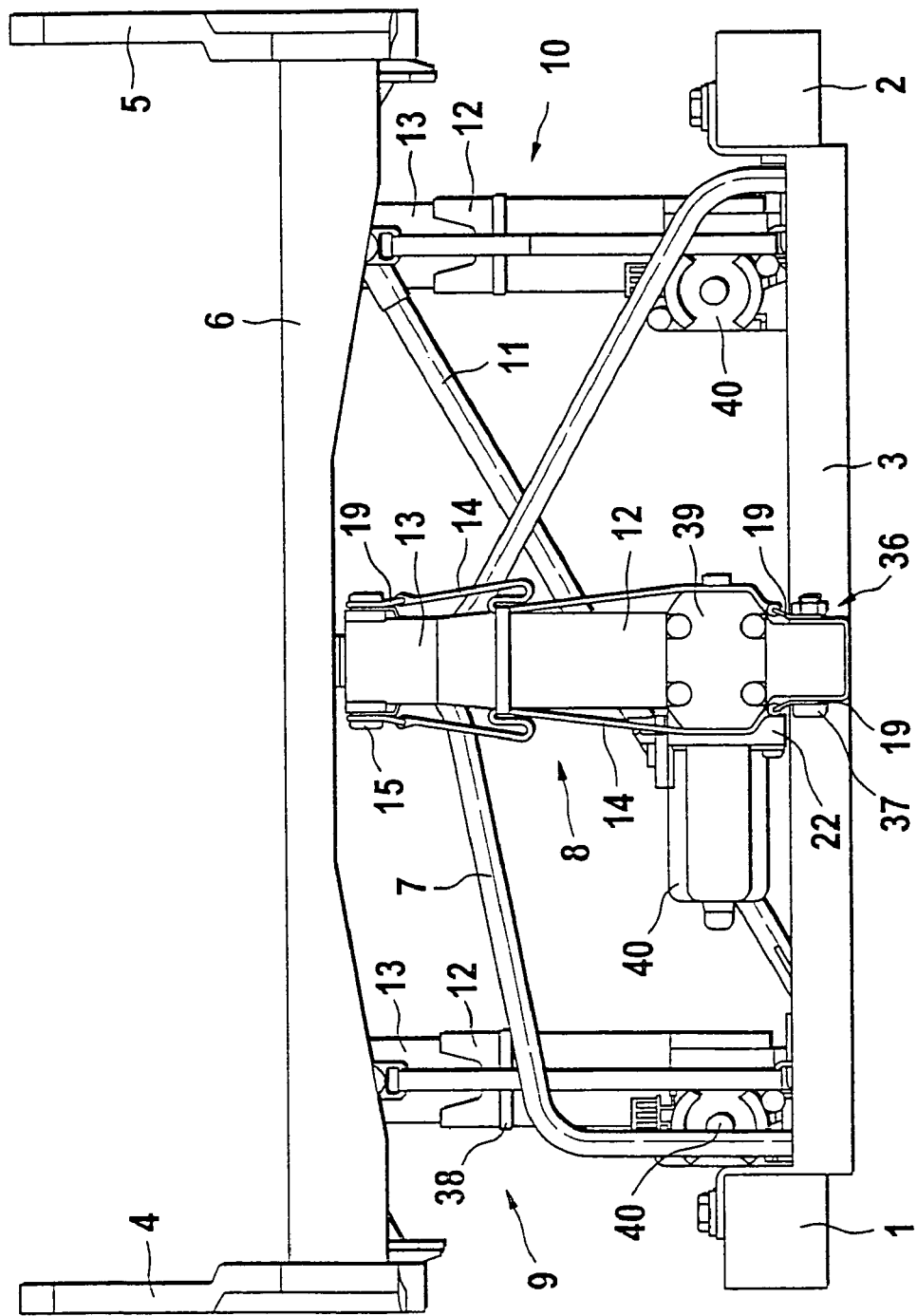
FIG. 1 shows the front view of a frame structure arranged on three lifting elements.

FIG. 1 shows the front view of a frame structure supported on the lifting elements.

The frame structure 4, 5, 6 is formed out of side sections 4, 5 that are connected with each other by way of the cross strut 6. A lifting element 8 which is supported on a section 3 is located in the center under the cross strut 6. The two seat rails 1, 2 extending perpendicular to the plane of the diagram are connected with each other by way of the section 3. A space rod 7 extends between the first lifting element 8 and the two rear lifting elements 9, 10, while the two lifting elements 9, 10 shown in the background are connected with a further bar-shaped space rod 11 running between these. The lifting elements 8, 9 and 10—each shown here provided with an electric drive motor 40—comprise telescopically extendable guide tubes 12 and 13. The guide tubes 12, 13 are provided with fixing straps 14, the eyes 19 of which are hung on a bolt 15, in order to limit the maximum possible extension position of the inner guide tube 13 out of the outer guide tube 12. Each of the fixing straps 14 of the lifting elements 8, 9 and 10 is accommodated on a bolt 37 at lower fixing strap immobilization points 36.

The front lifting element 8, anchored on the front part of the frame structure 4, 5, 6 in the center of the cross strut 6, is supported on the section 3, while the two rear lifting elements 9 and 10 are accommodated on the seat rails 1, 2. The diagonally running space bar 11, which connects the upper part of the lifting element 10 with the foot of the lifting element 9, is arranged between the rear lifting elements 9, 10. Each of the lifting elements 8, 9 and 10 is connected with the frame structure 4, 5 and 6 by way of an elastically designed bearing element 21—not shown here, however.

A pitching motion of the frame structure 4, 5, and 6 can be brought about in that the inner guide tube 13 of the front lifting element 8 extends, and the frame structure 4, 5, 6 swings horizontally perpendicular tot he plane of the diagram around the pivot points of the rear lifting elements 9 and 10. When the vehicle is driven around a corner, the innermost lifting element 9 or 10 can be lowered, and the outermost lifting element 9 or 10 can be extended, in order to tilt the frame structure 4, 5, 6—including the vehicle seat accommodated on this-toward the center of the curve. In order to make the tipping motion of the frame structure 4, 5 and 6 around the longitudinal axis possible, a length compensator is provided on the space rod 11, for example in the shape of a telescopic rod guide of two rod-shaped elements slid into each other. The same applies for the space rod 7, which is fastened on the bolt 15 of the front lifting element 8 and which is bolted to the seat rails 1, 2 at its two rear forked ends in such a way that a pitching motion of the frame structure 4, 5, and 6 around the pivot points formed by the two rear lifting elements 9, 10 is still possible.

Each of the lifting elements 8, 9 and 10 has a lifting range of approximately 50 mm; with consideration for the arrangement of the three lifting columns 8, 9 and 10 in relation to each other, the frame structure 4, 5, and 6 can be tilted by approximately 10° to the right or the left. The pitch angle of the frame structure 4, 5 and 6 around the rear pivot points on the lifting elements 9 and 10 is 10° to the front and approximately 10° to the rear. Using the drive motors 40, which are provided at the feet of each of the lifting elements 8, 9 and 10, and the gears 39, an adjusting time of 3.85 seconds is realized, starting from the center position of the frame structure 4, 5, and 6 with an extension height of approximately 25 mm and adjusting speeds of 6.5 mm/s.

Figure 2:
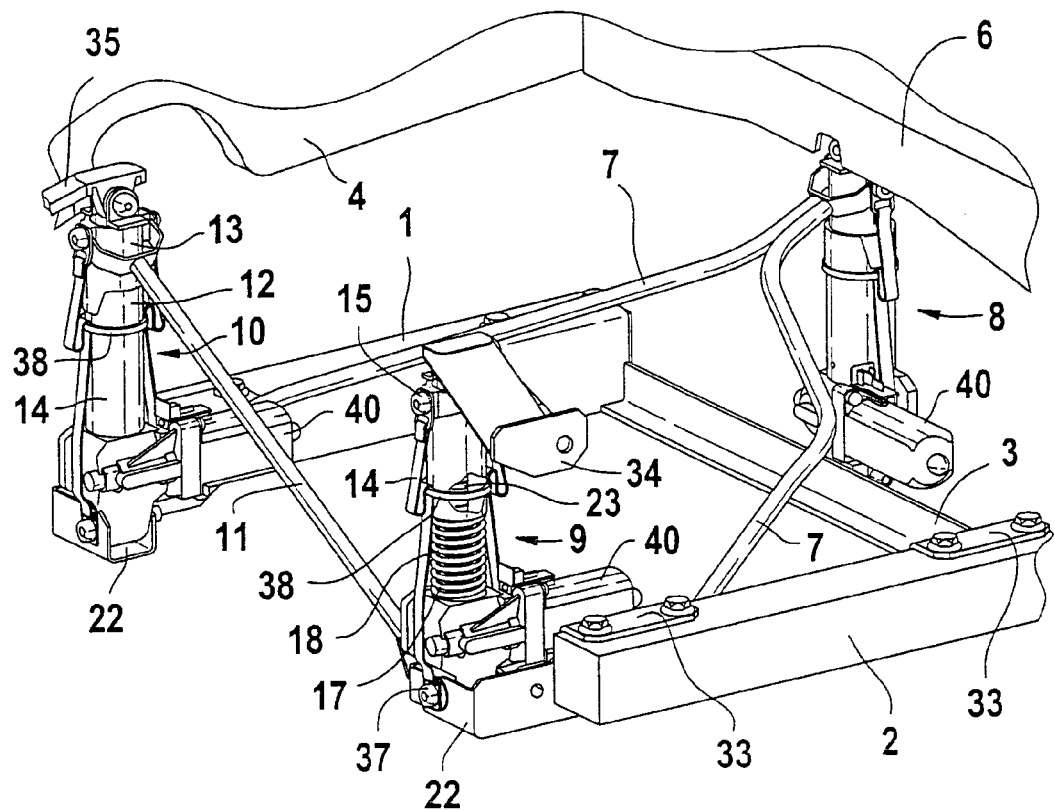
FIG. 2 shows a perspective top view of the three-point mounting of the frame structure.

The diagram according to FIG. 2 provides a perspective top view of a three-point mounting of the frame structure.

For illustration purposes, one of the side sections 4, 5 has been left out, in order to expose the structural components located behind it. A seat bracket 34, 35 in the form of an angled sheet-metal section is fastened to each of the two rear lifting elements 9, 10, to which the side sections 4, 5 of the connected frame structure 4, 5, 6 are fastened. The cross strut 6, situated in the front section of the frame structure 4, 5, 6, is supported in the center by the front lifting element 8, because this makes the pitching motion of the frame structure 4, 5, and 6 around the two rear lifting elements 9, 10 possible. On the rear lifting element 9—which is shown partially exposed-it can be seen that its threaded spindle 23 is enclosed by two spring elements 17, 18 that form a spring Pack and are inserted into each other and connected in parallel, which spring elements 17, 18 support the upward motion of the threaded nut which is used as a positioning block 28 traveling along the lifting spindle 23, which threaded nut preloads the spring elements 17, 18 in its lowered position, compressed to block length.

The space rod 11 shown here in simplified form is fastened on one side to the upper bolt 15 of the lifting element 10, and, on the other side, to the motor mount 22 of the lifting element 9. The lifting elements 8, 9 and 10 are all provided with rings 38 that constrict the fixing straps 14; the fixing straps 14 are fastened to the bolt 15 and the bolt 37 by means of the eyes 19 and limit the extension motion of the inner guide tube 13 out of the outer guide tubes 12. The space rods 7, 11 connecting the lifting elements 8, 9 and 10 with each other make possible a coordinated, straight-line course of positioning movement of the frame structure 4, 5, 6 from top to bottom and vice-versa. Using the space rods 7, 11, strong forces occurring in the case of an accident can be directed into the undercarriage of the vehicle chassis. Moreover, the space rods 7, 11 prevent the frame structure 4, 5, 6 from rotating around its vertical axis and absorb transverse forces that occur. To stiffen the bottom section of the frame structure 4, 5, 6, the motor mounts 22 are flange-mounted on the side rails 1, 2 by way of fastening brackets 33.

Figure 3:
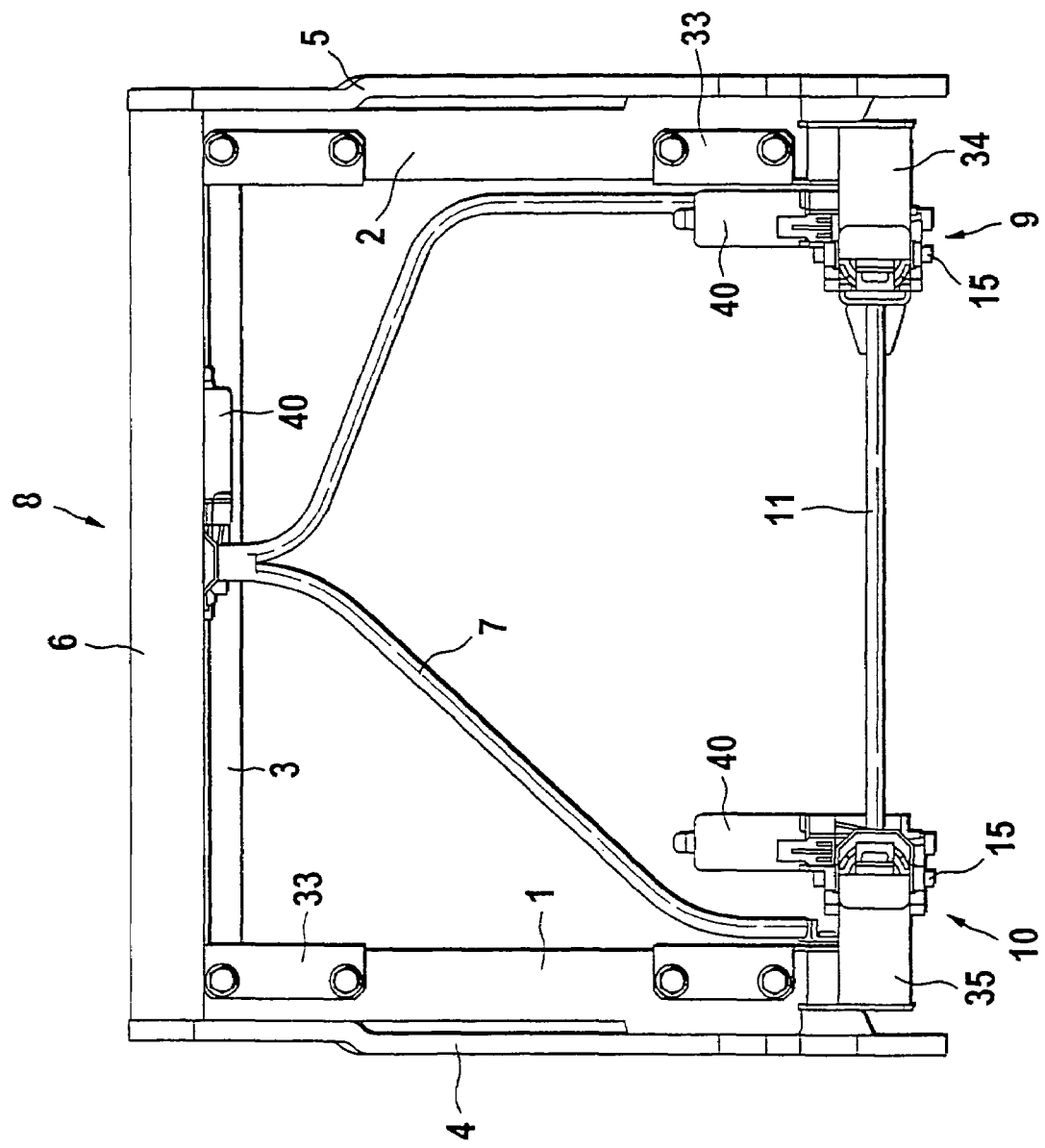
FIG. 3 shows a top view of the frame structure with space rods.

FIG. 3 shows a top view of the frame structure 4, 5 and 6 supported at each of three points by the lifting elements 8, 9 and 10.

The course of the space rods 7, 11 between the individual lifting elements 8, 9 and 10 is apparent in the top view. The tiltable and horizontally-swingable frame structure 4, 5, and 6 is located above the seat rails 1, 2 connected by the cross member 3. Each of the upper ends of the rear lifting elements 9 and 10 is provided with a seat bracket 34, 35, on which the side sections 4, 5 are flange-mounted to accommodate the vehicle seat. A separate drive 40 is assigned to each of the lifting elements 8, 9 and 10; the seat rails 1 and 2 provided beneath the frame structure 4, 5, 6 are bolted to each other by way of fastening brackets 33 in order to stiffen the structure. The space rod 7 is bolted in rotatable fashion to the seat rails 1, 2 in the rear section so that the frame structure 4, 5, 6 can execute pitching motions around its rear pivot points at the rear lifting elements 9 and 10.

Figure 4:
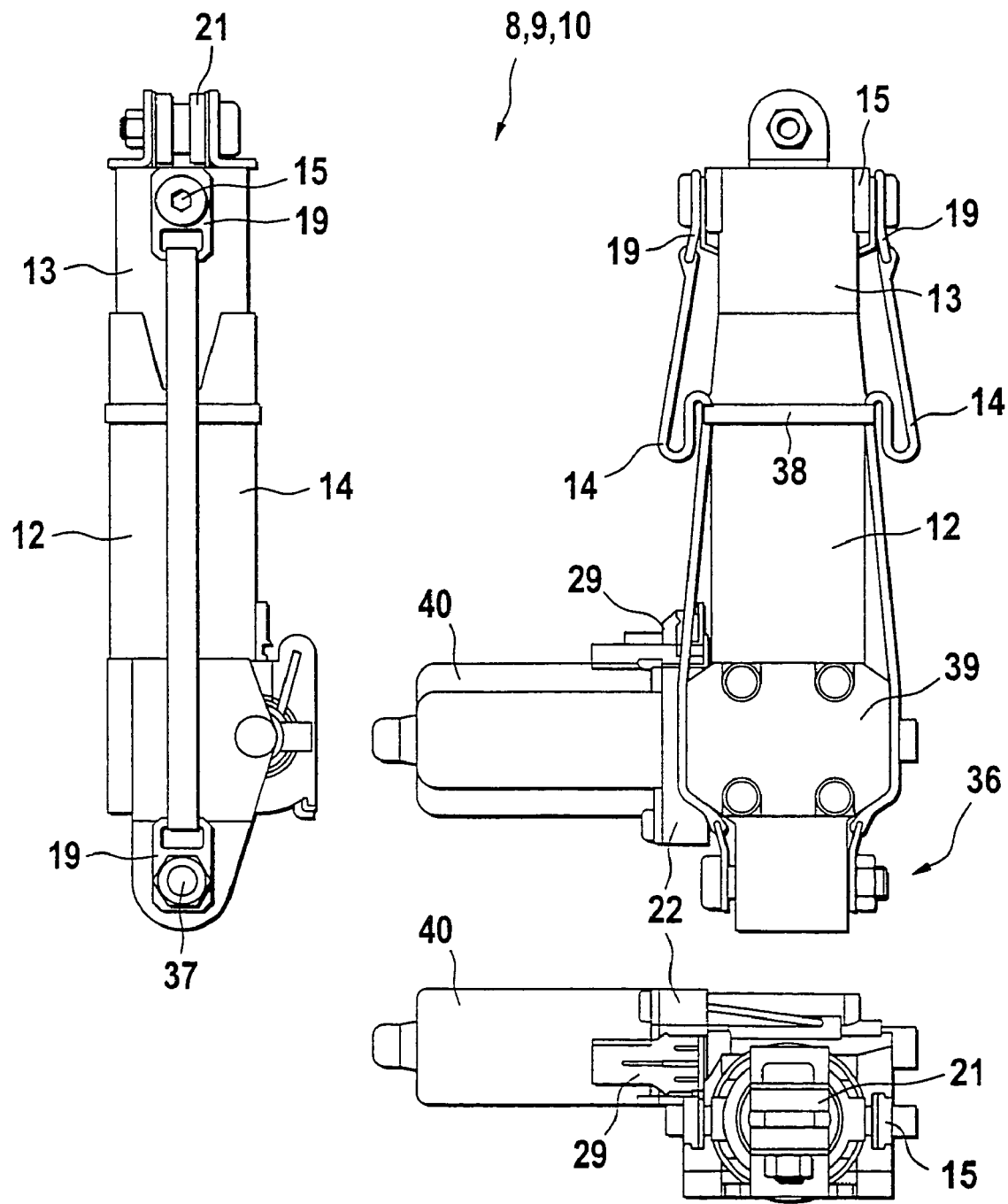
FIG. 4 shows the view of the lifting elements with flange-mounted, self-locking gears and drive motors.

FIG. 4 shows a multiside view of the lifting elements 8, 9 or 10.

The lifting elements 8, 9 or 10 are designed as compact units, which, thanks to their telescoping tubes 12, 13 can cover an adjusting range of between 50 mm and 60 mm; the fixing straps 14, which make the maximum extension motion possible, are hung by way of eyes 19 on the bolts 15, 37 provided on both the top and bottom. An elastic bearing element 21 is located on the upper end of the inner guide tube 13, with which the respective lifting elements 8, 9 or 10 can be secured to the frame structure 4, 5, 6. In the lower section of the lifting elements 8, 9 or 10, a drive motor 40 is connected with a self-locking drive formed by pre-supported gears 39 by way of a motor mount 22, by way of which the threaded spindle 23 located inside the lifting element 8, 9 or 10 can be set into rotation. The electrical connections 29 of the drive motor 40 can be identified above the drive motor 40, with which the drive motor 40 can be connected to the 12 V on-board power supply network.

Figure 5:
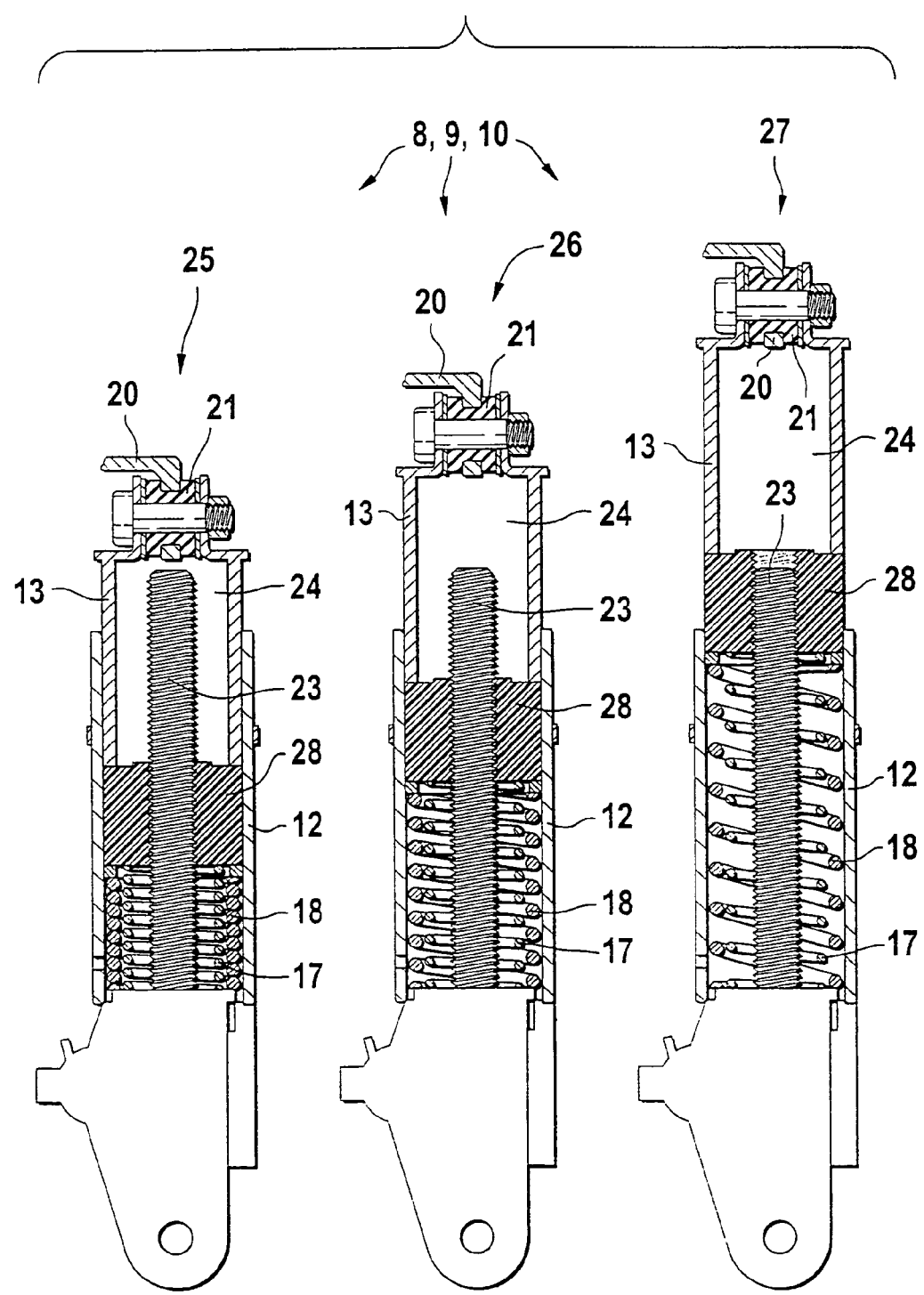
FIG. 5 shows the lifting elements in various operating positions.

FIG. 5 shows the diagram of lifting elements in various operating positions.

The inner guide tubes 13 of the lifting elements 8, 9 or 10 comprise an upper, elastically designed bearing element 21, with which they are connected with the respective components of the frame structure 4, 5, 6. The section 20 is intended here to represent one of the components of the frame structure 4, 5, 6. The inner guide tube 13 is supported on the top side of the positioning block 28 designed as a threaded nut. The threaded spindle 23, which is set into rotation by way of the presupported gears 39 and the drive motor 40, extends into the cavity 24 in the inner guide tube 13 and is acted upon from below by spring elements 17, 18.

In the position labelled "25", one of the spring elements 17, 18 connected in parallel, which can be designed as coil springs, is compressed to block length and thereby determines the lower position of the lifting elements 8, 9 or 10. The positioning block 28 is enclosed by the outer guide tube 12 in a such a fashion that it is secured against rotation and it moves in a middle operating position labelled "Position 26", for example, via rotation of the threaded spindle 23. In this middle position 26, the bearing element 21 is extended upward 25 mm, for example, out of its lowest position. Accordingly, a lifting element 8, 9 or 10 in Position 26 has access to an adjusting range of ±25 mm in both directions. The two coil springs 17, 18 connected in parallel support the positioning block 28 in its upward motion along the threaded spindle 23. The maximum extension position of the inner guide tube 13 out of the surrounding outer guide tube 12 is limited by the full tautness of the fixing straps 14 provided between the guide tubes 12, 13. In the maximum position labelled "27", the positioning block 28 is moved in its maximum position along the threaded spindle 23, and the spring elements 17, 18 have assumed their released position. The spring system connected in parallel relieves the spindle arrangement as it moves upward. In the case of the front lifting element 8, the maximum position 27 corresponds to a horizontal-swing angle of the vehicle seat surface of approximately 8 degrees, based on the rear supporting points of the frame structure 4, 5, 6 on the two rear lifting elements 9 and 10. This position can be created during the ride, for example, by way of the sensor technology during braking or during deceleration phases, in order to reduce the deceleration forces acting on the vehicle passengers. The same applies for the rear lifting elements 9, 10 of the frame structure 4, 5, 6. When the vehicle travels around a corner, for example, the innermost lifting element 9 or 10 in the rear section of the frame structure 4, 5, 6 is moved into Position 25 as shown in FIG. 5, while the outermost lifting element 9 or 10 assumes a middle Position 26 as shown in FIG. 5. As a result, the frame structure 4, 5, 6 accommodating the vehicle seat is tilted around its longitudinal axis during the ride.

Using the support of the frame structure 4, 5, 6 configured as three-point mounting, a spherical adjustment of the vehicle seat during the ride can be achieved, which is carried out as a function of the driving situation detected by the sensor technology, in order to reduce the transverse stresses occurring between the seat surface and the vehicle passengers.

Figure 6:
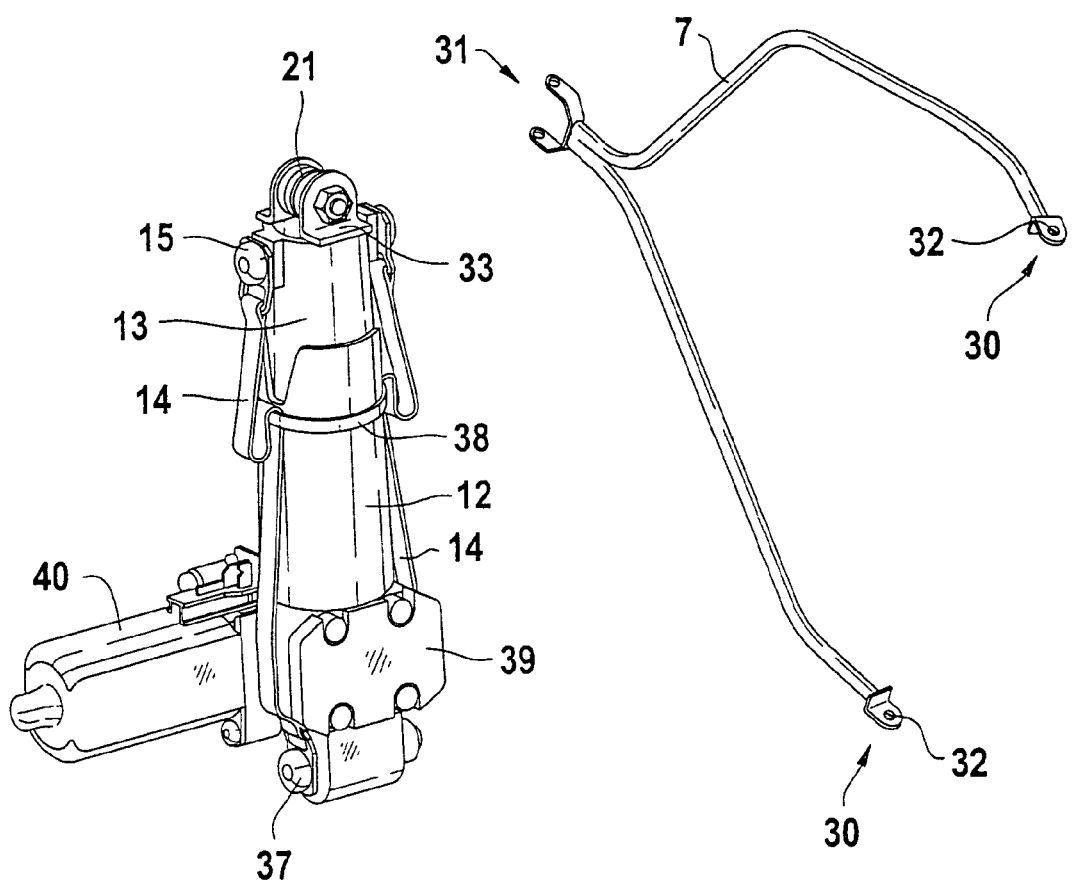
FIG. 6 shows the perspective diagram of a forked space rod, including lifting element.

FIG. 6 shows a perspective diagram of lifting element and sectional space bar.

The lifting element 8, 9 or 10 has an elastic bearing element 21 accommodated between two fastening brackets on the top side of its inner guide tube 13. The bolts 15, 37 can be identified on the lifting element 8, 9 or 10, in which the fixing straps 14 with their eyes provided on the ends are hung, moreover the electric drive 40 generating the spindle motion. Instead of an electric drive 40, the lifting elements 8, 9 or 10 can also be integrated in the hydraulic system of such motor vehicles that are equipped with power steering. In such a design variant, a lateral sway of the vehicle seats could be coupled with the steering motions, for example.

FIG. 6 shows the configuration of the space rod 7, which is fastened to the front lifting element 8 with its bearing fork 31 and is bolted to the seat rails 1, 2 with the corner piece 30 provided on its ends. The connection of the space rod 7 with the seat rails 1, 2 is carried out in such a way that the space rod 7 follows the pitching motion of the frame structure 4, 5, 6 around the rear pivot points on the lifting elements 9, 10 of the frame structure 4, 5, 6. In other words, it is supported rotatably on bearings on the respective seat rails 1, 2.

Figure 7:
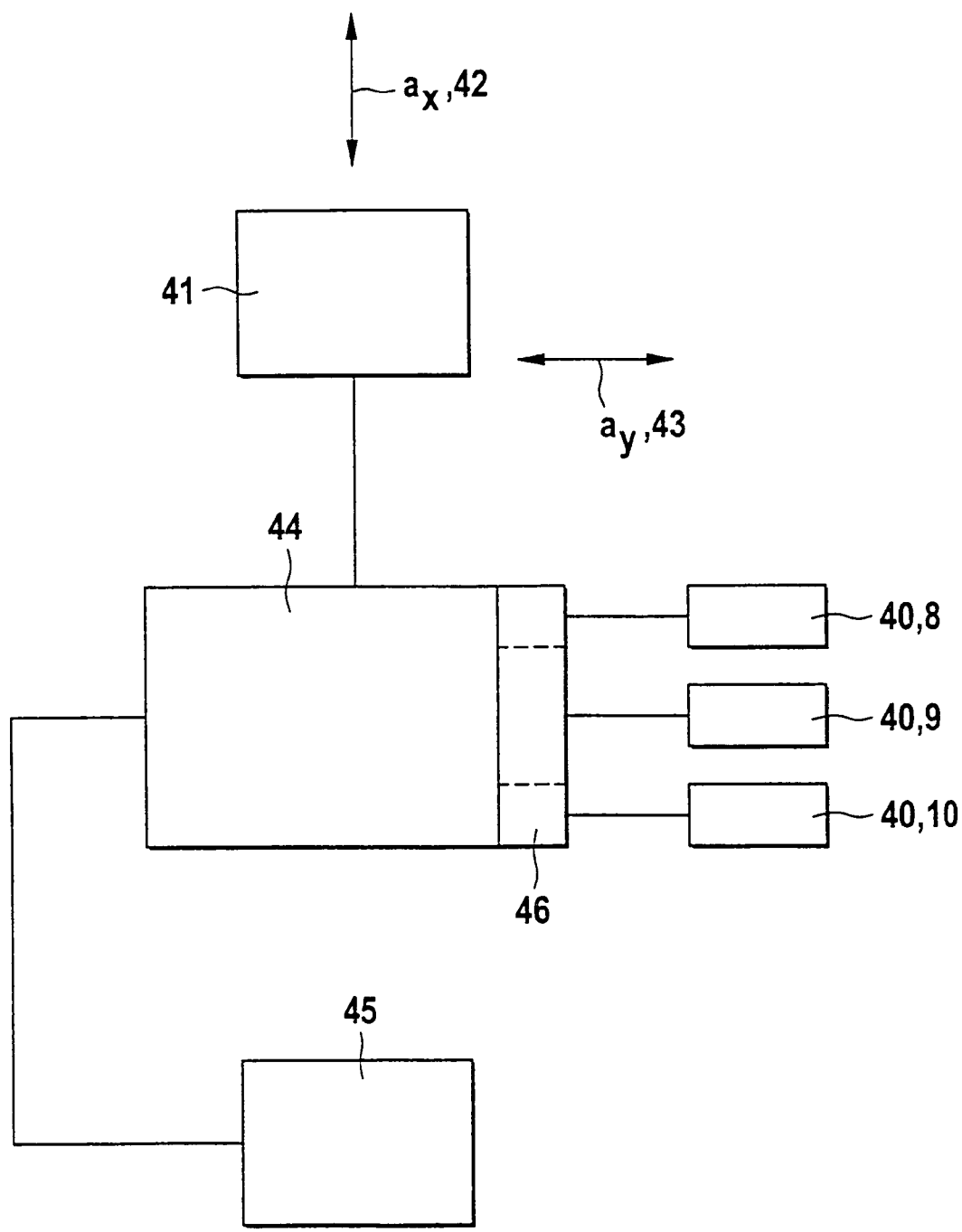
FIG. 7 shows the schematic diagram of the drive controls for multiple lifting elements.

FIG. 7 shows the control of the electric drive motors 40 in a greatly simplified form.

The variant shown here for the three motors 40 is provided when the frame structure 4, 5, and 6 is supported on bearings at three points. Each of the drives assigned to each of the lifting elements 8, 9, and 10 is controlled as a function of the measured accelerations $a_x$ and $a_y$ according to the driving situation. A two-axis acceleration sensor 41 can be used for this purpose, which contains a first acceleration axis 42 for measurement of the acceleration $a_x$ in X direction, when the vehicle accelerates or decelerates. The curve acceleration $a_y$ is determined in a further axis 43.

The values of the accelerations $a_x$, $a_y$ are transmitted to the control unit 44, with which each of the drive motors 40 of the elements 8, 9 and 10 is controlled in accordance with the driving situation determined by the acceleration measurements. The control unit can be advantageously provided with semiconductor outputs 46, with which a respective, speed-controlled control can be carried out. Moreover, the control unit 44 is connected with a control device 45.

REFERENCE SYMBOL LIST

1 Seat rail
2 Seat rail
3 Cross member
4 Side section
5 Side section
6 Cross strut
7 Space rod
8 Lifting element, front
9 Lifting element, rear
10 Lifting element, rear
11 Space rod
12 Guide tube, outer
13 Guide tube, inner
14 Fixing strap
15 Bolt
16 Spindle nut
17 Inner spring
18 Outer spring
19 Eye
20 Section
21 Elastic bearing element
22 Motor mount
23 Threaded spindle
24 Cavity
25 Block length position
26 Extended position
27 Maximum position
28 Positioning block
29 Electrical connection
30 Corner piece
31 Bearing fork
32 Hole
33 Fastening bracket
34 Seat bracket
35 Seat bracket
36 Lower fixing strap immobilization point
37 Bolt
38 Ring
39 Gears
40 Drive motor
41 Acceleration sensor
42 Acceleration $a_x$ 43 Corner acceleration $a_y$
44 Control unit
45 Control device
46 Semiconductor output

The invention claimed is:

1. Device for adjusting a vehicle seat, comprising a frame structure (4, 5, 6) which includes a left side section, a right side section, and a front cross strut and is adjustable using drive motors (40) having presupported drive units (39), and the vehicle seat is accommodated on two seat rails (1, 2) arranged parallel to each other, characterized in that the frame structure (4, 5, 6) of the vehicle seat is adjustable spherically using three lifting elements (8, 9, 10) which are arranged in a triangular formation in relation to each other underneath the frame structure (4, 5, 6), wherein the lifting elements (8, 9, 10) comprise tubes (12, 13) that can be moved in telescoping fashion, and wherein each of the drive units (39, 40) and drive motors (40) assigned to the lifting elements (8, 9, 10) can be controlled in such a way that a seat fastened to the frame structure (4, 5, 6) is moved in such a way as to counteract the forces occurring as a function of the driving situation.

2. Device according to claim 1, wherein the three lifting elements (8, 9, 10) are connected with each other by way of space rods (7, 11).

3. Device according to claim 1, wherein each of the lifting elements (8, 9, 10) is provided with spring elements (17, 18) to support the up-and-down motion of the lifting elements (8, 9, 10).

4. Device according to claim 3, wherein the spring elements (17, 18) are connected in parallel.

5. Device according to claim 3, wherein the spring elements (17, 18) are designed as springs.

6. Device according to claim 1, wherein the mounting of the frame structure (4, 5, 6) on the lifting elements (8, 9, 10) is carried out by way of elastic bearing elements (21) provided on the tubes (12).

7. Device according to claim 1, wherein the frame structure (4, 5, 6) is tilted around its longitudinal axis by the lifting elements (9, 10).

8. Device for adjusting a vehicle seat, comprising a frame structure (4, 5, 6) which includes a left side section, a right side section, and a front cross strut and is adjustable using drive motors (40) having presupported drive units (39), and the vehicle seat is accommodated on two seat rails (1, 2) arranged parallel to each other, characterized in that the frame structure (4, 5, 6) of the vehicle seat is adjustable spherically using three lifting elements (8, 9, 10) which are arranged in a triangular formation in relation to each other underneath the frame structure (4, 5, 6), wherein the lifting elements (8, 9, 10) comprise tubes (12, 13) that can be moved in telescoping fashion, and the maximum extension position (27) of the lifting elements (8, 9, 10) is limited by fixing straps (14) fastened to the telescope-like tubes (12, 13).

9. Device for adjusting a vehicle seat, comprising a frame structure (4, 5, 6) which includes a left side section, a right side section, and a front cross strut and is adjustable using drive motors (40) having presupported drive units (39), and the vehicle seat is accommodated on two seat rails (1, 2) arranged parallel to each other, characterized in that the frame structure (4, 5, 6) of the vehicle seat is adjustable spherically using three lifting elements (8, 9, 10) which are arranged in a triangular formation in relation to each other underneath the frame structure (4, 5, 6), wherein a positioning block (28) that can be moved on a threaded spindle (23) in the lifting elements (8, 9, 10) is supported by spring elements.

10. Device for adjusting a vehicle seat, comprising a frame structure (4, 5, 6) which includes a left side section, a right side section, and a front cross strut and is adjustable using drive motors (40) having presupported drive units (39), and the vehicle seat is accommodated on two seat rails (1, 2) arranged parallel to each other, characterized in that the frame structure (4, 5, 6) of the vehicle seat is adjustable spherically using three lifting elements (8, 9, 10) which are arranged in a triangular formation in relation to each other underneath the frame structure (4, 5, 6), wherein the pitch angle of the frame structure (4, 5, 6) is affectable by a center lifting element (8, 9) accommodated on the front cross strut (6).

11. A method for adjusting a vehicle seat, comprising the steps of providing a frame structure which includes a left side section, a right side section, and a front cross strut and is adjustable using drive motors having presupported drive units, accommodating the vehicle seat in two seat rails arranged parallel to one another, adjusting the frame structures spherically using three lifting elements which are arranged in a triangular formation in relation to each other underneath the frame structure, arranging one of the lifting elements in a middle of the front cross-strut, and providing each of the lifting elements with its own drive motor, moving each of the lifting elements independently, and so that a right hand side or a left hand side of the seat can be raised or lowered, and providing each of the lifting elements with spring elements and a positioning block which is movable on a threaded spindle.

* * * * *